United States Patent
Brewer et al.

(10) Patent No.: US 7,718,052 B2
(45) Date of Patent: May 18, 2010

(54) HYDROCARBON CRACKING IN A MULTI-ZONE CRACKING FURNACE

(75) Inventors: John Brewer, Katy, TX (US); David Brown, Houston, TX (US); Svend Rumbold, Northamptonshire (GB)

(73) Assignee: Stone & Webster Technology, Inc., Houston, TX (US)

( * ) Notice: Subject to any disclaimer, the term of this patent is extended or adjusted under 35 U.S.C. 154(b) by 0 days.

(21) Appl. No.: 11/973,606

(22) Filed: Oct. 9, 2007

(65) Prior Publication Data

US 2008/0029434 A1    Feb. 7, 2008

Related U.S. Application Data

(63) Continuation of application No. 09/493,350, filed on Jan. 28, 2000, now abandoned.

(51) Int. Cl.
  *C10G 9/14*    (2006.01)
(52) U.S. Cl. ............... 208/132; 208/72; 208/75; 208/78; 208/130; 431/329; 585/648; 585/652; 585/921
(58) Field of Classification Search ............ 208/72, 208/75, 78, 130, 132; 431/329; 585/648, 585/652, 921
See application file for complete search history.

(56) References Cited

U.S. PATENT DOCUMENTS

| | | | | |
|---|---|---|---|---|
| 4,492,624 A | * | 1/1985 | Johnson et al. | 208/78 |
| 4,552,644 A | * | 11/1985 | Johnson et al. | 208/78 |
| 5,711,661 A | * | 1/1998 | Kushch et al. | 431/329 |

* cited by examiner

*Primary Examiner*—Glenn Caldarola
*Assistant Examiner*—Prem C. Singh
(74) *Attorney, Agent, or Firm*—Locke Lord Bissell & Liddell, LLP; Alan B. Clement; Peter J. Fallon

(57) ABSTRACT

A process for independently and concurrently cracking at least two different hydrocarbon feedstocks to olefins. The process is carried out in a furnace for cracking hydrocarbon feed which has at least a first and second independent radiant cracking zone to produce a first cracked product and second cracked product that are separately withdrawn from the furnace.

5 Claims, 2 Drawing Sheets

HYDROCARBON CRACKING IN A MULTI-ZONE CRACKING FURNACE

CROSS REFERENCE TO RELATED APPLICATIONS

The present application is a continuation application of U.S. patent application Ser. No. 09/493,350, filed Jan. 28, 2000.

FIELD OF THE INVENTION

The present invention relates generally to an apparatus for thermally cracking a hydrocarbon feedstock. More particularly the present invention relates to an apparatus for providing improved operational flexibility of the furnace.

BACKGROUND OF THE PRESENT INVENTION

The petrochemical industry has long used hydrocarbon feedstocks for the production of valuable olefinic materials, such as ethylene and propylene. Ideally, commercial operations have been carried out using normally gaseous hydrocarbons such as ethane and propane as the feedstock. As the lighter hydrocarbons have been consumed and the availability of the lighter hydrocarbons has decreased, the industry has more recently been required to crack heavier hydrocarbons, such as naphthas and gas oils.

A typical process for the production of olefins from hydrocarbon feedstocks is the thermal cracking process. In this process, hydrocarbons undergo cracking at elevated temperatures to produce hydrocarbons containing from 1 to 4 carbon atoms, especially the corresponding olefins. Typically, the hydrocarbon to be cracked is delivered to a furnace comprised of both a convection and radiant heating zone. The hydrocarbon is initially preheated in the convection zone to a temperature below that at which significant reaction is initiated; and thereafter is delivered to the radiant zone where it is subjected to intense heat from radiant burners. Examples of conventional furnaces and processes are shown in U.S. Pat. No. 3,487,121 (Hallee), and U.S. Pat. No. 5,147,511 (Woebcke).

Illustratively, in the prior art, process fired heaters are used to provide the requisite heat for the reaction. The feedstock flows through a plurality of coils within the fired heater, the coils being arranged in a manner that enhances the heat transfer to the hydrocarbon flowing through the coils. The cracked effluent is then preferably quenched either directly or indirectly to terminate the reaction. In conventional coil pyrolysis, dilution steam is also employed to assist in reducing coke formation in the cracking coil.

In recent times, industry is requiring the building of larger plants which have increased capacity but which require less numbers of reactors. Thus, there has developed a need in the art to provide larger furnaces which are also flexible enough to handle a variety of different feedstocks to produce a variety of different olefin products. Because each different feedstock and desired product slate entails the use of different reaction conditions, primarily, reaction temperature and reaction residence time, none of the currently available furnace technologies are suitable. Previous attempts in the prior art to meet these increased capacity and flexibility requirements in a single furnace have proved insufficient.

It would therefore represent a notable advance in the state of the art if a furnace were developed which solved the problems of the prior art furnaces as described above.

SUMMARY OF THE PRESENT INVENTION

It is an object of the present invention to provide an improved apparatus and process having increased flexibility for the pyrolysis cracking of hydrocarbons to olefins.

Accordingly, the present invention provides a furnace for cracking hydrocarbon feed to produce olefins, which furnace comprises: (a) at least one fired radiant chamber, wherein each fired radiant chamber is divided into at least two separate independent radiant zones by a fired radiant chamber dividing means; (b) at least one radiant burner in each zone of the fired radiant chamber; (c) a convection chamber in direct communication with said fired radiant chamber; (d) at least one process coil for each separate independent radiant zone, wherein each process coil extends through at least a portion of the convection chamber and extends into one of the separate independent radiant zones before exiting the furnace; (e) a flue for discharging flue gas located at the top of the convection furnace; and (f) a means for independently controlling the radiant burners in each separate independent radiant zone.

DETAILED DESCRIPTION OF THE PRESENT INVENTION

The multi zone cracking furnace of the present invention will be described in relation to the furnace of FIG. 1 which has four separate and independent cracking zones. However, it is to be understood that the present application is not limited in any way to this detailed description, and all obvious modifications which this detailed description suggests to those of ordinary skill in the art are also contemplated by the present application and the appended claims.

Figure 1:
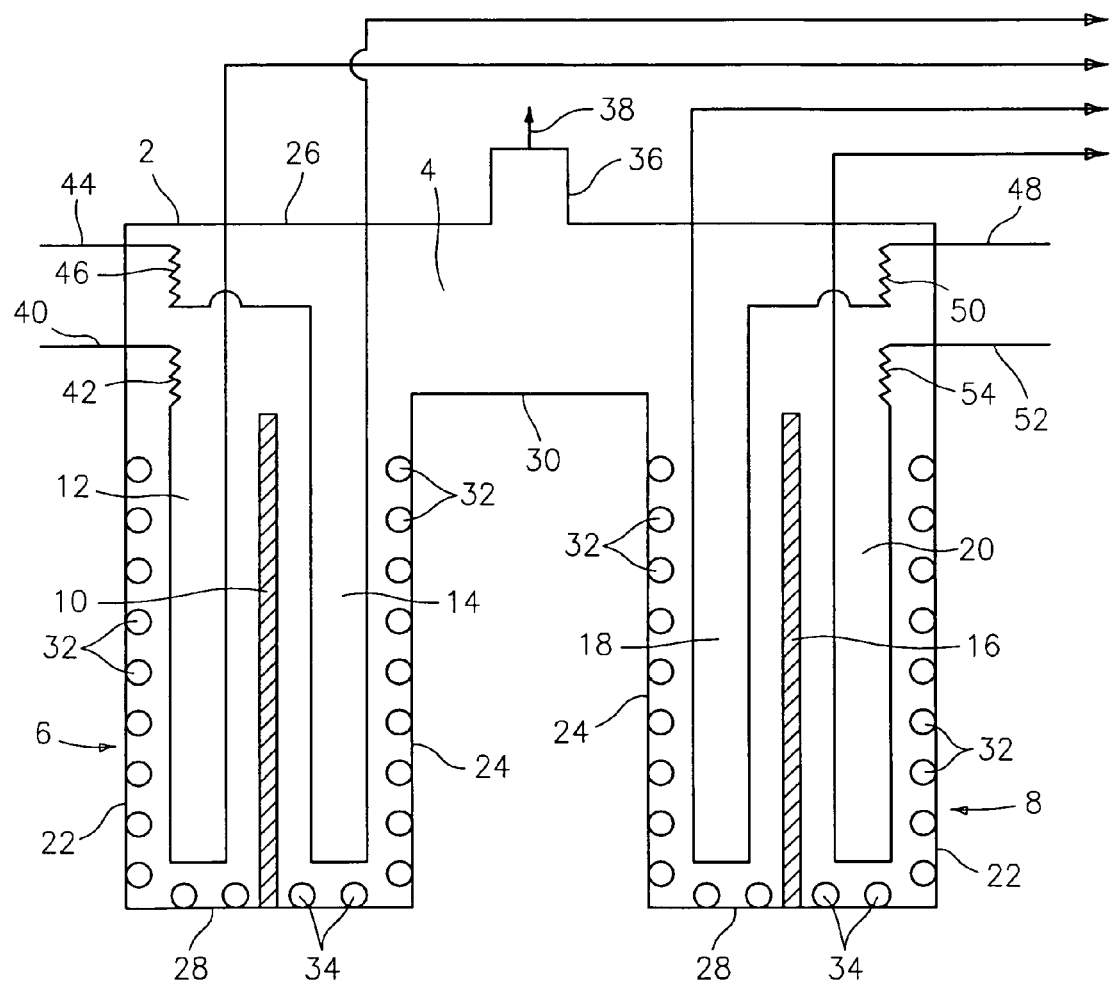
FIG. 1 depicts in schematic form an embodiment of the present invention.
Figure 2:
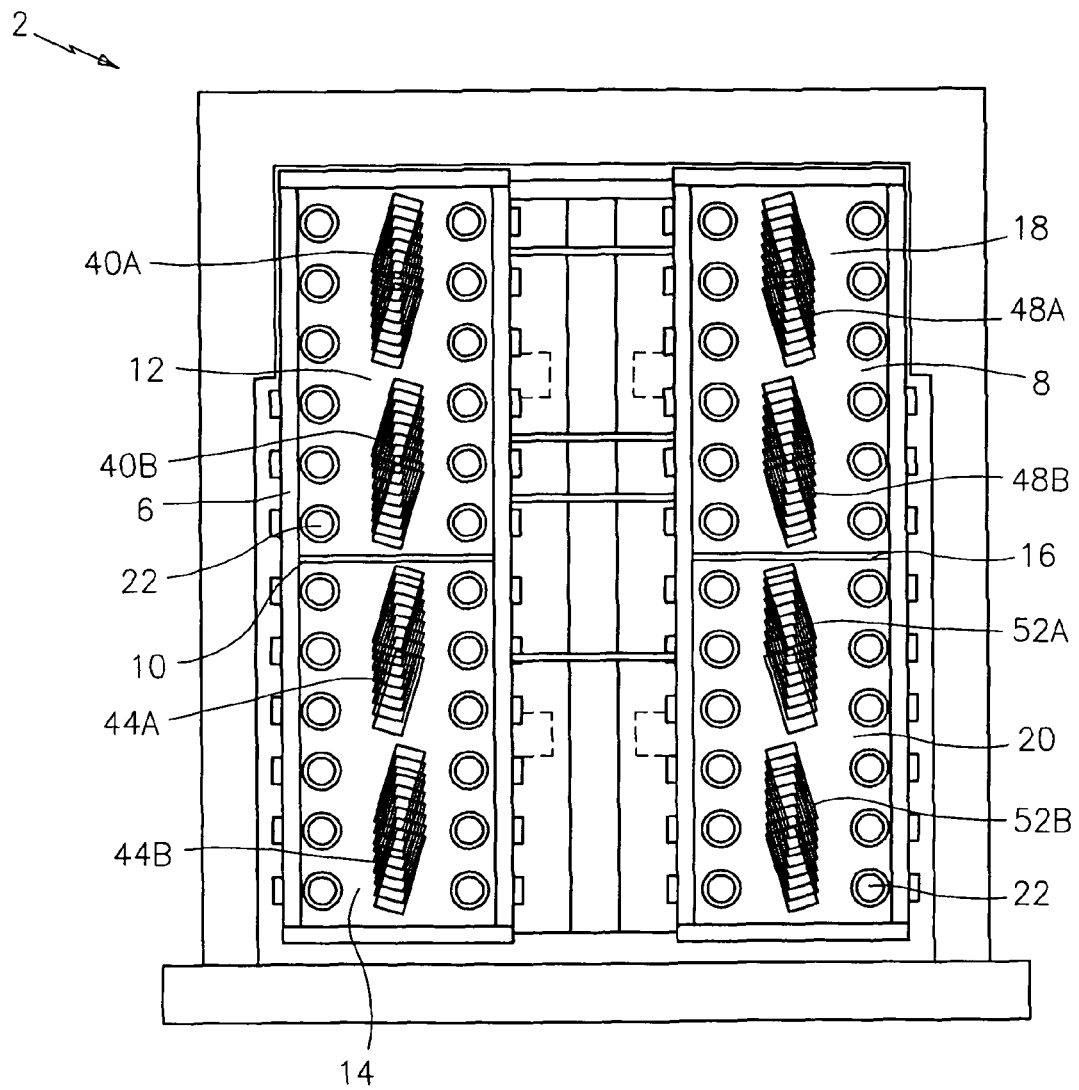
FIG. 2 illustrates a top cross sectional view of an embodiment of the present invention.

Referring to FIGS. 1 and 2, there is a shown a multizone pyrolysis furnace 2 of the present invention. The furnace 2 is provided with a convection section 4, a first fired radiant chamber 6 and a second fired radiant chamber 8. The first fired radiant chamber 6 is provided with a dividing wall 10 to divide the first radiant chamber 6 into a first separate independent radiant zone 12 and a second separate independent radiant zone 14. The second fired radiant chamber 8 is provided with a dividing wall 16 to divide the second radiant chamber 8 into a third separate independent radiant zone 18 and a fourth separate independent radiant zone 20.

In the embodiment of FIGS. 1 and 2 the dividing walls 10 and 16 divide their respective radiant chambers into substantially equal area separate independent radiant zones. However, it will be appreciated by those of ordinary skill in the art that the dividing wall may be located in the chamber to provide unequal area separate independent radiant zones. Additionally, more than one dividing wall, or any combination of number of dividing walls, may be employed in the radiant chambers of the furnace. For example, in the first radiant chamber, two dividing walls could be employed to divide the first radiant chamber into three equal area independent radiant zones, and in the second radiant chamber, three dividing walls could be employed to divide the second radiant chamber into four unequal independent radiant zones.

The dividing wall can be made only of a material which can withstand the temperatures in the radiant zone of the reactor, which can exceed temperatures of 2200° F. Accordingly, the dividing wall may be comprised of conventional fire brick. The dividing wall may also be comprised of a cloth-type material known as Nextel or may be a curtain made of this material, alone or in combination with a ceramic fiber material. In this type of embodiment the curtain is hung from rod supports. Other materials which provide similar thermal properties may be used.

Nextel is a tradename of the 3M Company for a family of ceramic fiber textile products. Nextel fibres are made from a synthetic precursor, not molten refractory oxides as are typically the case with ceramics. The synthetic fiber is formed in a continuous length to a controlled diameter and are then pyrolyzed to convert the synthetic materials into a ceramic. The continuous filament ceramic fibers are spun into yarns and roving which can then be used to weave, braid, knit or twist a variety of textile product forms, including a fabric for the curtains of the present invention. Preferred for use in the present invention is Nextel 312 which is composed of alumina/silica/boria. Also contemplated for use herein is Nextel 440.

It is important to the practice of the present invention that the dividing wall be constructed so that the conditions in one of the separate independent radiant zones do not substantially effect the conditions in an adjacent separate independent radiant zone. In this manner, the conditions in each adjacent radiant zone can be independently and separately controlled by adjustment of the radiant burners along the wall and/or floor of the zone as described hereinbelow.

Returning to FIG. 1, the furnace 2 can be seen to be comprised of outer walls 22, centrally disposed walls 24, a roof 26, floors 28 and a chamber separating floor 30. Conventional wall burners 32 are arranged in an array along the outer walls 22 and centrally disposed walls 24. Additional conventional floor burners 34 are arranged in an array along the floors 28. The burners 32 and 34 may be supplied in conventional manner with natural gas or other combustible gas or finely dispersed fuels through headers, manifolds or individual pipes leading to each burner which are not shown. The particular type of radiant heat burner and the details associated therewith need not be described herein since they are well known and are conventional in the art. Any type of radiant heat burner can be used which provides substantially all of the heat by radiation. Important to the present invention is that each burner or array of burners in each independent radiant zone be separately and independently controlled, such as by regulating the amount of fuel supplied to the radiant burners. In this manner, the cracking temperature in each separate and independent radiant zone may be separately and independently controlled.

The furnace is also provided with a flue 36 for removing flue gases from the burners in a line 38.

The furnace 2 of FIG. 1 is also provided with four process coils. The first process coil 40 is preheated in exchanger 42 in the convection chamber 4 and then proceeds through into the first separate independent radiant zone 12. The second process coil 44 is preheated in exchanger 46 in the convection chamber 4 and then proceeds through the second independent radiant zone 14. The third process coil 48 is preheated in exchanger 50 and then proceeds through the third independent radiant zone 18. The fourth process coil 52 is preheated in exchanger 52 and then proceeds through the fourth independent radiant zone 20. In FIG. 2, for example, each radiant of the four radiant zones 10, 14, 18 and 20 is provided with two process coils, 40A, 40B, 44A, 44B, 48A, 48B, 52A and 52B, respectively.

Each of the process coils can independently be of separate lengths and/or configurations. Generally, the tubes are disposed vertically in the independent radiant zones, and are often of serpentine configurations. Other process coil configurations known to those skilled in the art are also contemplated for use herein. The coils may be of any length desired and generally have one portion proceeding downward into the independent radiant zone, a u-turn connecting zone, and one portion proceeding upward out of the independent radiant zone. Depending on the amount of product desired, a particular independent radiant zone can have a coil configuration designed to contain as many coils as necessary to obtain the desired capacity. For example, an independent radiant zone may be provided with from 1 to about 20 or more coil assemblies.

Each of the coils from the independent radiant heating zones then exit the furnace 2. Preferably, the process coils are provided with a quenching apparatus for rapid quenching of the effluent product gases. Any of the quenching apparatuses known to those skilled in the art may be employed in the practice of the present invention. See, e.g., Woebcke et al., U.S. Pat. No. 5,427,655. Additionally, it is contemplated by the present invention that each coil can be provided with its own quenching apparatus or the effluents from the process coils may be combined in any configuration and then quenched.

In an exemplary process employing the present invention, a first feed stream of ethane at a temperature of about 70° F. to about 80° F. is fed into coil 40 which is preheated in exchanger 42 in convection section 4, wherein it is heated to a temperature in the range of from about 1100° F. to about 1200° F.

During the preheating step, depending on the boiling range of the feedstock the feed may be partially or completely vaporized. Also, in processes where steam is used, steam is added to the feed prior to the feed being introduced into the radiant zone. For example, the steam can be added at points in the preheat section, preferably where the feed is at least 70% vaporized. The steam when added in this manner acts to completely vaporize the feed by reducing the hydrocarbon partial pressure. The steam also functions to maintain low hydrocarbon partial pressure in the radiant zone for improved cracking efficiency and reduced coking.

Again, in each of the process coils, differing amounts of steam may be added to each of the coils depending upon the desired cracking to be performed in the process coils, i.e., the type of feedstock and the desired product slate.

The coil 40 then proceeds into the first separate and independent radiant zone 12 wherein it is heated by radiant heat supplied from the radiant burners 32 and 34 along the walls and floor of the first separate and independent radiant zone 12. Typically, an ethane feedstock will be cracked at a temperature ranging from about 780° C. to about 1000° C. for a residence time of from about 0.01 seconds to about 0.08 seconds.

Independently, but concurrently, process coil 44 is provided with a propane feedstock at a temperature of from about 70° F. to about 80° F. and is preheated in the convection zone 4 in exchanger 50 to a temperature in the range of from about 1100° F. to about 1200° F. The process coil 44 then proceeds into the second separate and independent radiant zone wherein it is heated by radiant heat supplied from the radiant burners 32 and 34 along the walls and floor of the second separate and independent radiant zone 14. Typically, a propane feedstock will be cracked at a temperature ranging from about 780° C. to about 1000° C. for a residence time of from about 0.01 seconds to about 0.08 seconds.

Although both first and second radiant heating zones 12 and 14 are located in the same radiant chamber 6, the temperature in each zone may be separately controlled due to the provision of dividing wall 10 and the control of the amount of fuel burnt in the radiant burners of the radiant heating zone. Thus, two different feedstocks may be cracked in the same radiant chamber at separate and independent conditions, thereby allowing improved flexibility in the cracking operation. Of course, if desired, both process coils 40 and 44 could be provided with the same feedstock and cracked at substantially the same conditions.

A third feed stream of naphtha at a temperature of about 70° F. to about 80° F. is fed into coil 48 which is preheated in exchanger 50 in convection section 4, wherein it is heated to a temperature in the range of from about 1100° F. to about 1200° F. The coil 48 then proceeds into the third separate and independent radiant zone 18 wherein it is heated by radiant heat supplied from the radiant burners 32 and 34 along the walls and floor of the third separate and independent radiant zone 18. Typically, a naphtha feedstock will be cracked at a temperature ranging from about 780° C. to about 1000° C. for a residence time of from about 0.01 seconds to about 0.08 seconds.

Independently, but concurrently, process coil 52 is provided with a vacuum gas oil (VGO) feedstock at a temperature of from about 70° F. to about 80° F. and is preheated in the convection zone 4 in exchanger 54 to a temperature in the range of from about 1100° F. to about 1200° F. The process coil 52 then proceeds into the fourth separate and independent radiant zone 20 wherein it is heated by radiant heat supplied from the radiant burners 32 and 34 along the walls and floor of the second separate and independent radiant zone 20. Typically, a VGO feedstock will be cracked at a temperature ranging from about 780° C. to about 1000° C. for a residence time of from about 0.01 seconds to about 0.08 seconds.

Although both third and fourth radiant heating zones 18 and 20 are located in the same radiant chamber 8, the temperature in each zone may be separately controlled due to the provision of dividing wall 16 and the control of the amount of fuel burnt in the radiant burners of the radiant heating zone. Thus, two different feedstocks may be cracked in the same radiant chamber at separate and independent conditions, thereby allowing improved flexibility in the cracking operation. Of course, if desired, both process coils 48 and 52 could be provided with the same feedstock, or could be provided with a similar feedstock as being cracked in process coils 40 and/or 44 and cracked at substantially the same conditions.

Alternatively, where the full capacity of the furnace 2 is not required, one or more of the separate and independent radiant zones may be left idle by use of steam in the coil without effecting the cracking processes proceeding in the radiant zones in use. This further provides improved flexibility to the cracking apparatus of the present invention.

Many variations of the present invention will suggest themselves to those skilled in the art in light of the above-detailed description. For example, although the process of the present invention has been exemplified with ethane, propane, naphtha and VGO feedstocks, other feedstocks known to be used as feedstocks in radiant furnace pyrolysis cracking can also be employed within the practice of the present invention. All such obvious modifications are within the full intended scope of the appended claims.

All of the above-referenced patents, patent applications and publications are hereby incorporated by reference.

The invention claimed is:

1. A process for independently and concurrently cracking at least two different hydrocarbon feedstocks each in a different process coil to olefins wherein said process is carried out in a furnace for cracking hydrocarbon feed, said furnace comprising
   (i) at least one fired radiant chamber, wherein each said radiant chamber is divided into at least two separate independent radiant zones by a fired radiant chamber dividing means;
   (ii) at least one radiant burner in each said separate independent radian zone of said fired radiant chamber;
   (iii) a convection chamber in direct communication with said fired radiant chamber(s);
   (iv) at least one process coil for each said separate independent radiant zone, wherein each said process coil extends through at least a portion of said convection chamber and extends into one of said separate independent radiant zones before exiting said furnace;
   (v) a flue for discharging flue gas located at the top of said convection chamber of said furnace; and
   (vi) means for independently controlling the radiant burners in each said separate independent radiant zone;
wherein process comprising:
   (a) feeding a first hydrocarbon feedstock into a first process coil, which first process coil directs said first feedstock into a first independent radiant cracking zone in said furnace and cracking the first feedstock at a first cracking temperature to produce a first cracked product;
   (b) separately feeding a second hydrocarbon feedstock, independent of and different from said first hydrocarbon feedstock, into a second process coil, which second process coil directs said second feedstock into a second independent radiant cracking zone, different from said first independent cracking zone, and cracking said second feedstock at a second cracking temperature, different from said first cracking temperature, to produce a second cracked product
   (c) withdrawing said first cracked product from said furnace; and
   (d) separately withdrawing said second cracked product from said furnace.

2. A process as defined in claim 1 wherein said process comprises separately cracking four separate and independent feedstocks in separate and independent cracking zones in said furnace.

3. A process as defined in claim 1 wherein said fired radiant chamber dividing means is a combination of a curtain of Nextel material and ceramic fiber wall.

4. A process as defined in claim 1 wherein the temperature of each said separate and independent radiant zone is controlled independently by means for separately and independently controlling each burner or array of burners in each said separate and independent radiant zone.

5. A process for independently and concurrently cracking at least two different hydrocarbon feedstocks each in a different process coil, wherein said process is carried out in a furnace for cracking hydrocarbon feed, said furnace comprising
   (i) at least one fired radiant chamber, wherein each said radiant chamber is divided into at least two separate independent radiant zones by a fired radiant chamber dividing means;
   (ii) at least one radiant burner in each said separate independent radian zone of said fired radiant chamber;
   (iii) a convection chamber in direct communication with said fired radiant chamber(s);

(iv) at least one process coil for each said separate independent radiant zone, wherein each said process coil extends through at least a portion of said convection chamber and extends into one of said separate independent radiant zones before exiting said furnace;
(v) a flue for discharging flue gas located at the top of said convection chamber of said furnace; and
(vi) means for independently controlling the radiant burners in each said separate independent radiant zone;

wherein process comprising:

(a) feeding a first hydrocarbon feedstock into a first process coil, which first process coil directs said first feedstock into a first independent radiant cracking zone in said furnace and cracking the first feedstock at a first cracking temperature to produce a first cracked product;

(b) separately feeding a second hydrocarbon feedstock, independent of and different from said first hydrocarbon feedstock, into a second process coil, which second process coil directs said second feedstock into a second independent radiant cracking zone, different from said first independent cracking zone, and cracking said second feedstock at a second cracking temperature, different from said first cracking temperature, to produce a second cracked product (c) withdrawing said first cracked product from said furnace; and (d) separately withdrawing said second cracked product from said furnace.

\* \* \* \* \*